United States Patent
Friesen

(10) Patent No.: US 6,390,489 B1
(45) Date of Patent: May 21, 2002

(54) HITCH FOR ATTACHING A TRAILER OR CART TO A FORKLIFT

(76) Inventor: Delton Friesen, 1524 S. 108th Way, Chandler, AZ (US) 85248

( * ) Notice: Subject to any disclaimer, the term of this patent is extended or adjusted under 35 U.S.C. 154(b) by 0 days.

(21) Appl. No.: 09/619,931

(22) Filed: Jul. 20, 2000

Related U.S. Application Data

(63) Continuation of application No. 09/504,943, filed on Feb. 15, 2000, now abandoned, which is a continuation of application No. 08/980,582, filed on Dec. 1, 1997, now Pat. No. 6,024,374.

(51) Int. Cl.⁷ .................................................. B60D 1/52
(52) U.S. Cl. ..................... 280/504; 280/491.5; 280/495; 187/237
(58) Field of Search ................................ 280/511, 504, 280/507, 491.5, 506, 495; 187/222, 237; 414/607

(56) References Cited

U.S. PATENT DOCUMENTS

| | | | |
|---|---|---|---|
| 2,723,130 A | | 11/1955 | Andrews |
| 2,809,759 A | * | 10/1957 | Manker |
| 3,622,181 A | | 11/1971 | Smith |
| 3,837,677 A | | 9/1974 | Haskins |
| 3,881,619 A | * | 5/1975 | Morris ........................ 214/620 |
| 4,049,146 A | * | 9/1977 | Decker ....................... 214/620 |
| 4,243,354 A | * | 1/1981 | Garcia ........................ 414/607 |
| 4,280,713 A | * | 7/1981 | Bruhn ..................... 280/415 A |
| 4,505,489 A | | 3/1985 | Specie |
| 4,566,708 A | | 1/1986 | Specie |
| 5,067,742 A | * | 11/1991 | Reija ....................... 280/479.2 |
| 5,184,840 A | * | 2/1993 | Edwards ..................... 280/507 |
| D337,410 S | * | 7/1993 | Jones .......................... D34/28 |
| 5,725,231 A | * | 3/1998 | Buie ....................... 280/455.1 |
| 6,135,701 A | * | 10/2000 | Galloway, Sr. .............. 414/607 |

* cited by examiner

Primary Examiner—Brian L. Johnson
Assistant Examiner—Avraham H. Lerner
(74) Attorney, Agent, or Firm—Ellis, Venable & Busam

(57) ABSTRACT

A device that enables a forklift beam to transport trailers or other mobile vehicles whereby a trailer hitch attachment is secured to a hollow shaft at one end of the device and a forklift beam on a forklift vehicle is secured to a hollow shaft at the other end of the device. When both the forklift beam and the trailer hitch are secured to the device, a mobile vehicle or trailer may be secured to the trailer hitch and transported via the forklift. The device may also receive a generic elongated beam in place of the trailer hitch such that the forklift can be used to lift heavy objects for transport such as combustion engines by securing a rope or chain to the engine and then securing the chain or rope around the beam.

10 Claims, 4 Drawing Sheets

HITCH FOR ATTACHING A TRAILER OR CART TO A FORKLIFT

This application is a continuation of patent application Ser. No. 09/504,943 filed on Feb. 15, 2000, now abandoned, and which was a continuation of patent application Ser. No. 08/980,582 filed Dec. 1, 1997 and now U.S. Pat. No. 6,024,374.

FIELD OF THE INVENTION

The present invention relates to the field of transportation devices. Specifically, the present invention is a device designed to attach a mobile trailer or cart to a forklift vehicle.

BACKGROUND

The standard method of transporting small to medium-sized trailers is with the use of a vehicle such as an automobile or truck. The vehicle generally has a standard steel trailer hitch secured to its rear portion. The trailer generally contains a device capable of receiving the trailer hitch and securing it, such that a motorized vehicle may pull the trailer to its destination.

Due to the fact that larger trailers are generally heavier, they typically require a motorized vehicle using this method to transport the trailer. However, for smaller trailers, such as those that transport jet skis or other small loads, the use of a motorized vehicle may not be necessary.

Trailers, dollies, and carts are frequently employed in warehouses to transport boxes and containers of equipment and goods. One machine that is commonly used in warehouses to move boxes and crates is a forklift vehicle. It is therefore highly desirable to invent a device that could attach the cart, or trailer to the forklift vehicle. This would increase the versatility of forklift vehicles and reduce the amount of equipment needed in a warehouse.

Devices for transporting carts and trailers are well known and exist in many varieties. For example, U.S. Pat. No. 4,505,489 issued to Specie, discloses a dolly system for campgrounds and parks that consists of a general purpose dolly and various attachments for the general purpose dolly. The patent generally discloses the use of an adaptable attachment for use on a dolly. However, the Specie patent does not make specific reference to a device that would include two parallel plates and pin assembly that may be used as a collar to secure to a single flat beam of a forklift device.

U.S. Pat. No. 4,566,708 also issued to Specie, was a continuation of the above Specie patent. This patent discloses a dolly system for campgrounds and parks that consists of a general purpose dolly and various attachments for the general purpose dolly. The patent generally discloses the use of an adaptable attachment for use on a dolly. However, it does not make specific reference to the present invention that includes two parallel plates and pin assembly that may be attached to one of the two parallel beams that comprise the lifting platform of a forklift.

U.S. Pat. No. 2,723,130 issued to Andrews, discloses a support for outboard motor for boats. This generally discloses a figure with a trailer hitch attached to what appears to be a dolly. However, the figure does not disclose the system of securing the trailer hitch to one of the two beams that form the lifting platform of a forklift as set forth in the present invention.

U.S. Pat. No. 3,622,181 issued to Smith Discloses a vehicular device for safe and convenient launching of small pleasure boats and the like from soft ground or from dirt ramps. The patent also discloses a figure showing a trailer hitch attached to a dolly-like device. However, the figure does not disclose the parallel plate and pin assembly used in conjunction with a forklift fork plane as set forth in the present invention.

U.S. Pat. No. 3,837,677 issued to Haskins, discloses a stabilizing trailer hitch dolly consisting of a dolly frame and a cross member carrying a trailer hitch ball. The patent includes a figure showing a trailer hitch attached to a dolly-like device. However, as in the Smith patent, this patent does not disclose the parallel plate and pin assembly used in conjunction with a forklift as set forth in the present invention.

Many forklift vehicles currently have standard ball hitches secured to the rear of the vehicle in order to transport trailers or carts. These ball hitches are secured to the forklift vehicle at the end opposite of the end supporting the forklift. However, many forklift vehicles do not have hitches secured to the vehicle to transport trailers, or carts. It is therefore highly desirable to design a hitch that can be quickly and cheaply attached to a forklift with a minimum of effort in order to enable the forklift vehicle to transport carts and trailers.

Other patents discuss approaches and devices for transporting trailers using a trailer hitch similar to those as set forth by the issued patents described above. However, none of these patented inventions include a parallel plate assembly secured to one of the two beams that form the lifting platform of the forklift vehicle by a pin as set forth by the present invention. The flexibility and simplicity that allows a user to attach such a device to one of the two beams of the forklift vehicle by a pin is presently unknown in the current state of the art.

SUMMARY OF THE INVENTION

The present invention is a device for attaching trailers and carts to a forklift vehicle. A forklift is comprised of two parallel beams that are raised and lowered in unison to raise and lower a crate or package supported by the two parallel beams. These two parallel beams therefore form a single lifting platform. The device is secured to one of these two beams. The device is a structure formed from two parallel plates that fit over the flat plane of the single beam of the forklift. One feature of the present invention is that it is removable from the single beam of the forklift. The single beam of the forklift is adapted to receive the device by having a single hole drilled in the beam. The device has a hole drilled through the center such that a pin fits through the device and the plane of the beam thereby removably securing the device to the forklift. A standard trailer hitch is attached to the top plate of the device. A steel ball is secured to the square hitch. The trailer or cart is then secured to the steel ball of the trailer hitch.

The primary object of this invention is to provide a device that will secure a trailer or cart to the forklift of a forklift vehicle.

A further object of this invention is to provide a trailer hitch that will removably attach to the forklift of a forklift vehicle with simplicity and ease of effort.

A still further object of the invention is to provide a trailer hitch that will removably attach to the forklift of a forklift vehicle with a minimal amount of modification to the forklift.

Further objects and advantages of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DESCRIPTION OF THE PREFERRED EMBODIMENTS

Figure 1:
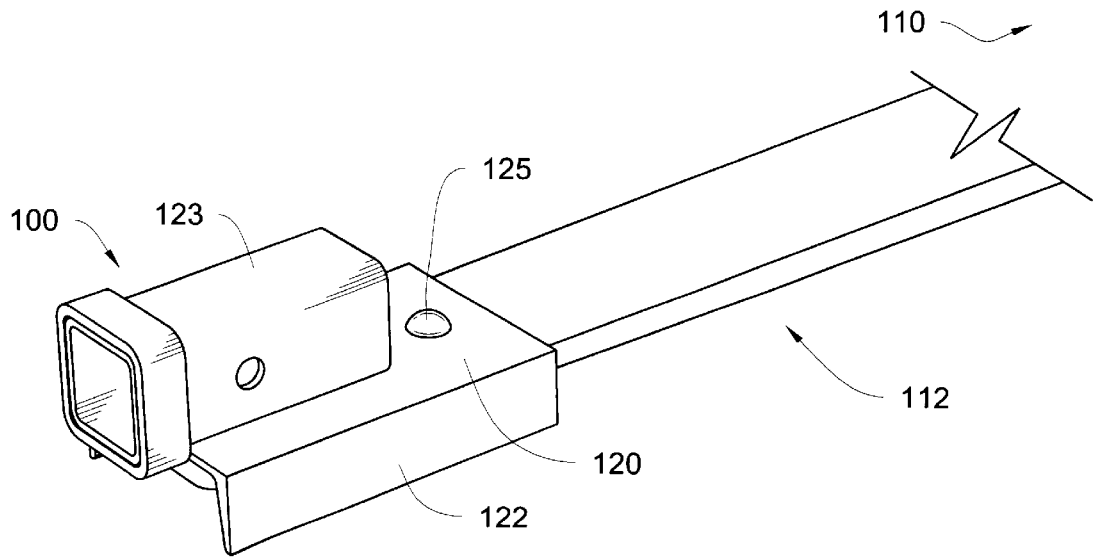
FIG. 1 is a view of the device in actual use on a standard forklift of a forklift vehicle.

Referring to the figures by characters of reference, described below is the preferred embodiment of the present invention. FIG. 1 shows a connecting device 100 that is securely attached to a standard forklift vehicle 110. The connecting device 100 is removably attached to a single beam 112 of a forklift 111 on the standard forklift vehicle 110.

Figure 2:
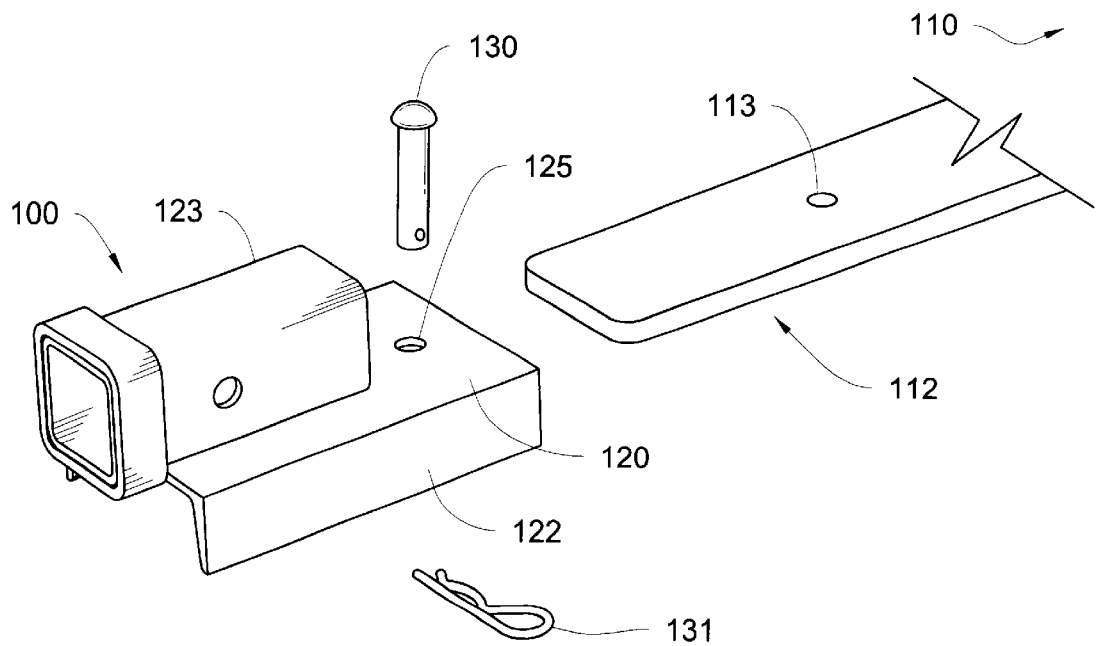
FIG. 2 is a view of the device next to a single beam of the standard forklift showing the holes in the device and the single beam that are used to connect the device to the single beam.
Figure 4:
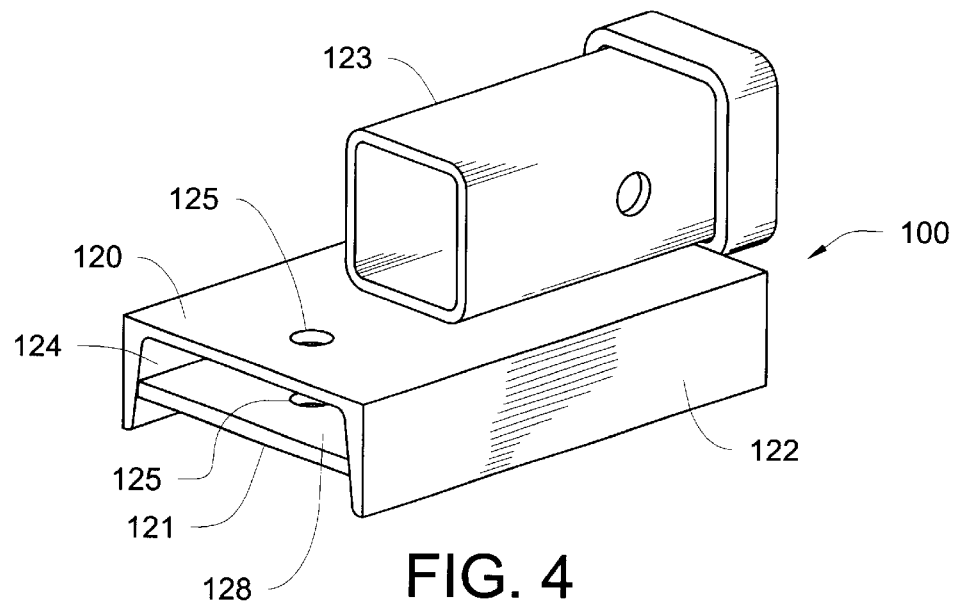
FIG. 4 is a perspective view of the device.
Figure 7:
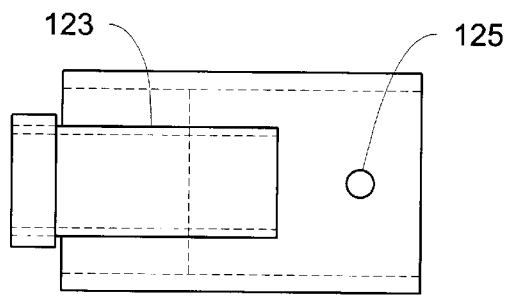
FIG. 7 is a top view of the device.
Figures 3, 5, 6:
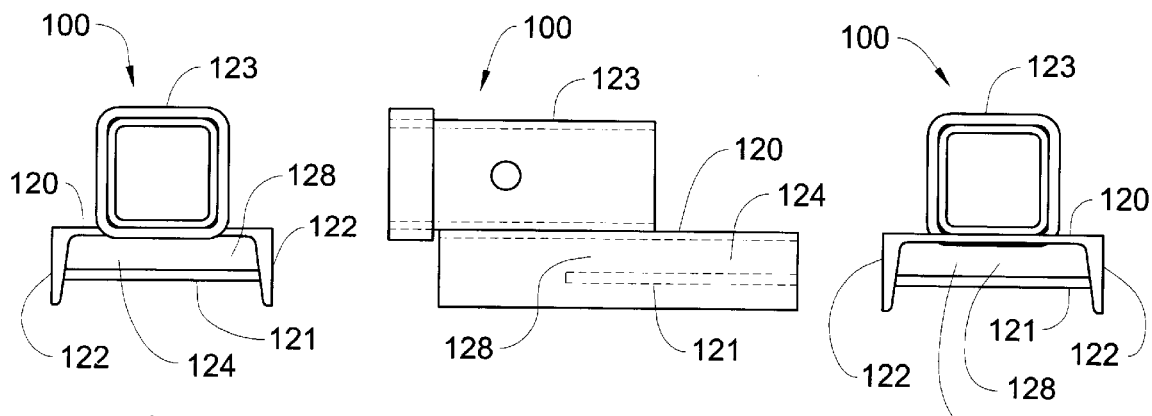
FIG. 3 illustrates a front view of the device.
FIG. 5 is a side view of the device.
FIG. 6 is a rear view of the device.

The connecting device 100 is made of steel components welded together. Referring to FIGS. 1, 2, and 3, the connecting device 100 is comprised of a top plate 120, a bottom plate 121, two supporting side plates 122, and a substantially square shaft, or hollow trailer shaft, 123 mounted to the top of the top plate 120. It is important to note that side plates 122 are not secured parallel to each other. Side plates 122 are secured at an angle with respect to each other. The top plate 120, bottom plate 121, and two supporting plates 122 are welded together to form a rectangular shaft 124 that has a hollow interior portion 128 that slides onto the single beam 112 of the forklift 110. Due to the fact that side plates 122 are secured at an angle with respect to each other, hollow interior portion 128 is tapered. The reason side plates 122 are formed at an angle to create a tapered hollow interior portion 128 lies in the shape of the beams 112 of a forklift 111. The beams 112 of a forklift are tapered. The beams 112 are wider at the base 112A than at the front 112B. Therefore, the tapered hollow interior portion 128 will only slide a certain distance along beam 112 until the taper of the beam 112 matches the taper of the interior 128 thereby stopping the device 100 at a certain position. As shown by FIG. 1, the size of the rectangular shaft 124 is just larger than the size of the single beam 112 so that the connecting device 100 fits securely onto the single beam 112. A hole 125 is formed in the top and bottom plates 120 and 121. Similarly, a hole 113 is formed in the single beam 112. The connecting device 100 is slid onto the single beam 112 such that hole 113 is aligned with hole 125. A pin 130 is the positioned within holes 125 and 113 thereby securing the connecting device 100 to the single beam 112.

Referring to FIGS. 3 through 8, various views of the connecting device 100 are shown. The plates, 120, 121, and 122 that are welded together to form the rectangular shaft 124 are shown. The hole 125 formed in the top and bottom plates 120 and 121 for receiving the pin 130 is also shown. An additional hole 140 is formed in the substantially square shaft 123 mounted to the top of the top plate 120. The hole 140 is formed along an axis orthogonal to the hole 125. The substantially square shaft 123 has a collar 126 welded on the end of the substantially square shaft 123. The collar 126 enhances the structural rigidity of the substantially square shaft 123. Note that the longitudinal axis of the substantially square shaft 123, also called the hollow trailer shaft 123, is parallel to the longitudinal axis of the rectangular shaft 124.

Figure 8:
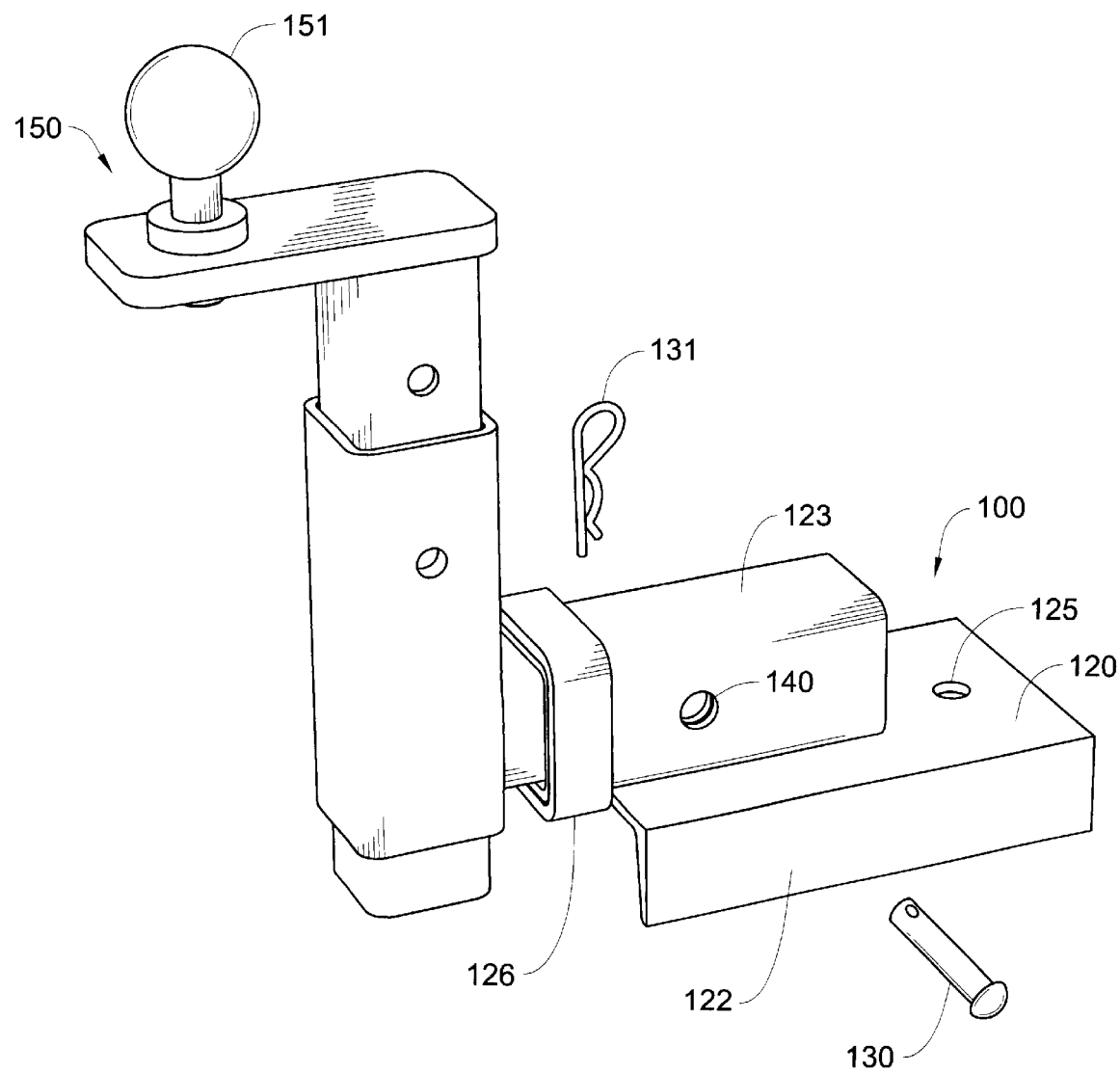
FIG. 8 is an alternate perspective view of the device showing a trailer hitch attached to the device.

The substantially square shaft 123 is designed to secure to a standard trailer hitch 150 shown in FIG. 8. The standard trailer hitch 150 is comprised of a stainless steel ball 151 connected to a steel rod 152. The rod 152 also has a hole 153 formed in the shaft along an axis identical to the hole 140. The rod 152 has a size that is just smaller than the interior of the substantially square shaft 123 such that rod 152 slides snugly within square shaft 123. In order to attach rod 152 to square shaft 123, the rod 152 is slid into the square shaft 123 until hole 153 is aligned with hole 140. A second pin 131 is slid through holes 123 and 153 thereby securing rod 152 to square shaft 123.

It is possible to disconnect the trailer hitch 150 from the connecting device 100 by removing pin 131. Once pin 131 is removed, it is possible to slide the trailer hitch 150 out from the connecting device 100. It is also possible to disconnect the connecting device 100 from the single beam 112 of the forklift vehicle 110 by removing pin 130. Once pin 130 is removed, it is possible to slide the connecting device 100 out away from the single beam 112. It is also possible to insert a standard generic elongated beam in place of the trailer hitch 150 so that other devices such as combustion engines may be lifted and transported by securing a chain or rope to the engine and the elongated beam.

Figure 9:
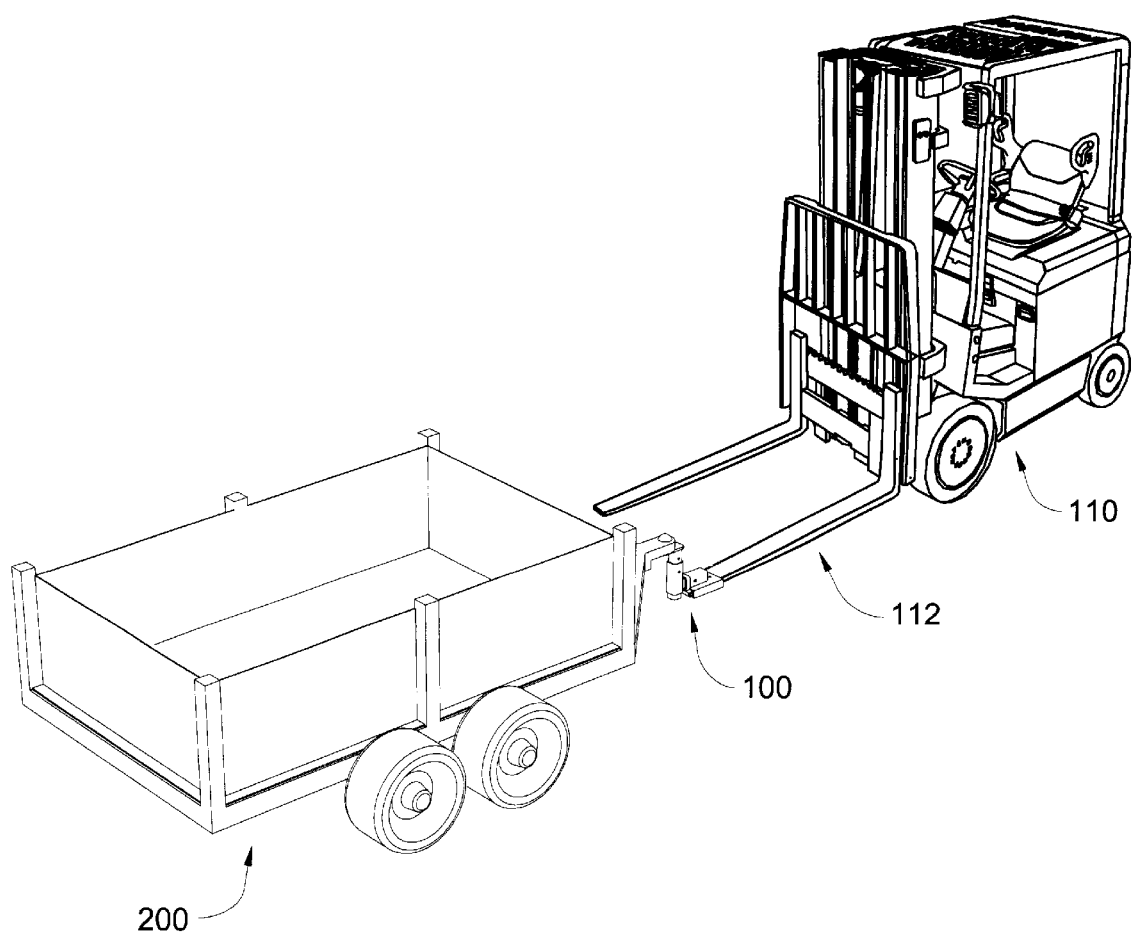
FIG. 9 is a view of the device in actual use on a standard forklift vehicle showing the forklift vehicle utilizing the device to pull a trailer.

FIG. 9 shows the connecting device 100 mounted to the forklift 110. The trailer hitch 150 is mounted to the connecting device 100. A trailer 200 is removably secured to the trailer hitch 150. This configuration, shown in FIG. 9, shows the invention performing its intended function, attaching a trailer 200 to a forklift 110 for transport. The trailer 200 is transported by moving the forklift 111 to a level where it is possible to insert a receiving portion 210 of the trailer 200 onto the steel ball 151 of the trailer hitch 150. It is desirable to maintain the trailer 200 at an angle substantially parallel to the ground. It is possible to adjust the angle of the trailer 200 by raising or lowering the height of the forklift 111. Once the steel ball 151 is inserted to the receiving portion 210 of the trailer 200, the forklift vehicle 110 may then be used to transport the trailer 200 to a desired location.

While the invention has been shown and described with reference to a particular embodiment thereof, it will be understood to those skilled in the art, that various changes in form and details may be made without departing from the spirit and scope of the invention.

I claim:

1. A device for securing a trailer hitch to a forklift vehicle, the trailer hitch having a coupling beam and the forklift having a beam with an aperture therethrough, said device comprised of:

a top plate, said top plate further comprising a first void, said first void penetrated by a first securing pin inserted though the aperture in the beam that is aligned with the first void;

a bottom plate;

a pair of side plates, said pair of side plates are secured to said top plate and said bottom plate forming a four sided shaft with a hollow interior for receiving a beam of a forklift;

a substantially square shaft for receiving the second beam, said substantially square shaft is secured to said top plate and further comprises a void located on at least one side of said substantially square shaft, said void being capable of receiving a second pin that secures said second beam to said substantially square shaft.

2. The device recited in claim 1, further comprising a collar, said collar secured to an end of said substantially square shaft thereby increasing the structural integrity of said substantially square shaft.

3. The device recited in claim 1 wherein the bottom plate further comprises a second void, said second void being at least as large as said first void and is positioned and centered along an orthogonal axis of the first void.

4. The device recited in claim 3, wherein said substantially square shaft is secured to said top plate such that a longitudinal axis of said substantially square shaft is parallel to a longitudinal axis of said four sided shaft.

5. The device recited in claim 3, wherein said four sided shaft is tapered such that said side plates are secured to said top and bottom plates at an angle with respect to each other.

6. The device in claim 3, wherein said beam of a forklift further comprises a third void, such that when said four sided shaft receives the beam of the forklift, the third void is capable of lining up with the second void along its orthogonal axis wherein the first pin may fill the second and third voids thereby securing the beam of the forklift to said device.

7. The device in claim 3, wherein said second beam is secured to a trailer hitch.

8. A device for attaching a trailer hitch to a forklift vehicle, the trailer hitch having an extending coupling beam, and the forklift vehicle having a forklift beam with an aperture therethrough, said device comprised of:

a substantially rectangular shaft having a hollow interior running along a longitudinal axis of said rectangular shaft, the inside wall of the rectangular shaft shaped to contact the outside horizontal edge of the forklift beam, and a void through a wall in the substantially rectangular shaft that is aligned with the forklift beam aperture for inserting a securing pin therethrough; and a hollow trailer shaft that receives the extending coupling beam of the trailer hitch into a securable position, said hollow trailer shaft is secured to a top plate.

9. The device recited in claim 8, further comprising a collar, said collar secured to an end of said hollow trailer shaft thereby increasing the structural integrity of said hollow trailer shaft.

10. The device recited in claim 9, wherein said hollow trailer shaft is secured to said rectangular shaft such that a longitudinal axis of said hollow trailer shaft is parallel to the longitudinal axis of said rectangular shaft.

* * * * *